UNITED STATES PATENT OFFICE.

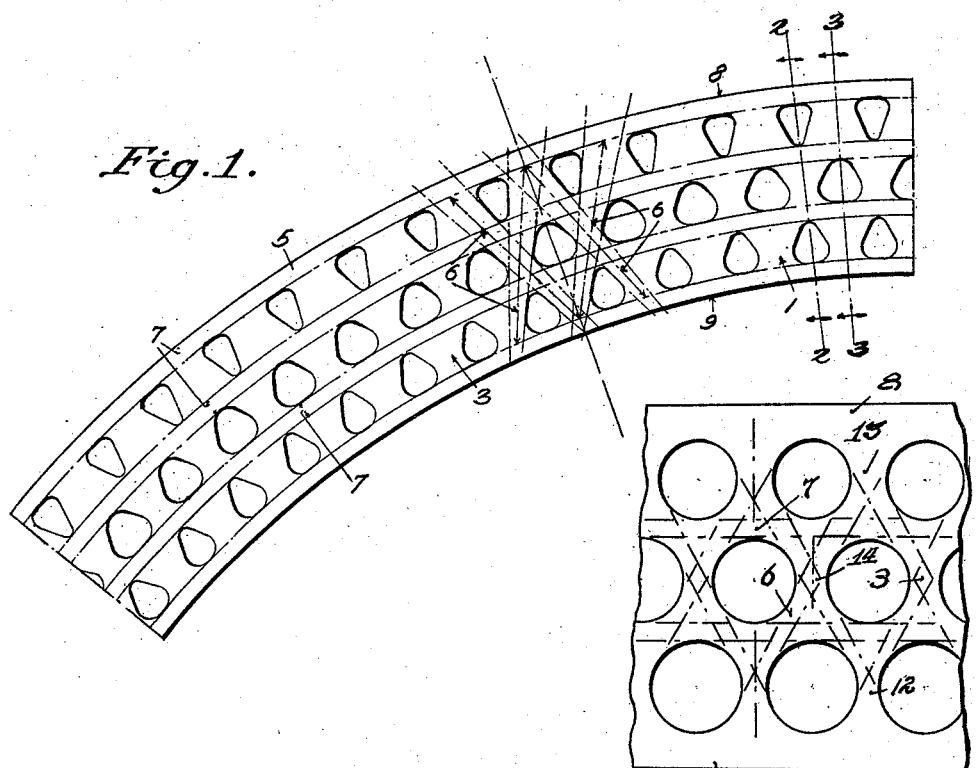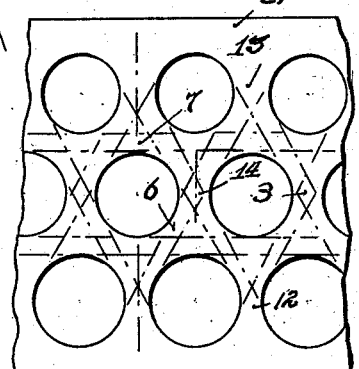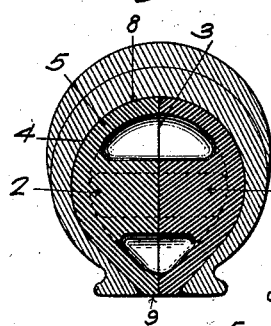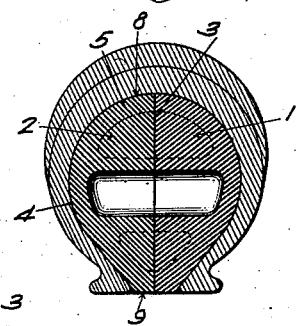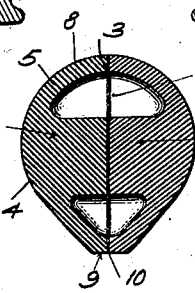

CHRIS H. LAMBERT, OF CINCINNATI, OHIO, ASSIGNOR TO HERCULES RUBBER CORPORATION, OF CINCINNATI, OHIO, A CORPORATION OF DELAWARE.

RESILIENT TIRE.

1,402,624.     Specification of Letters Patent.     Patented Jan. 3, 1922.

Application filed November 11, 1919. Serial No. 337,151.

*To all whom it may concern:*

Be it known that I, CHRIS H. LAMBERT, a citizen of the United States, and residing at 140 Wildwood Ave., Cincinnati, in the county of Hamilton and State of Ohio, have invented a new and useful Improvement in Resilient Tires, of which the following specification is a full disclosure.

The invention relates to an improvement in resilient tires or enclosed cores or fillers for the commercial pneumatic tire casings to replace the inflated tubes.

An object of the present invention is the provision of a cellular sectional inner core as a removable filler for the commercial pneumatic tire casing possessing the resiliency of a pneumatic tire and capacity to sustain the weight of the vehicle load and road shocks, and keep the casing expanded and full to reduce undue friction between the parts and prevent heating detrimental to the casing while in use.

Another object of the invention is to provide a resilient core composed of a plurality of core sections having abutting plane faces with cells or recesses in the plane faces arranged in a plurality of circumferential rows to form integrally a semi-circumferential tubular portion for each section interiorly braced by cross webbing of gradual increasing thickness from the inner rim point toward the outer tread point, and circumferential bands or continuity of material intermediate of the rim and tread portions, as interior bridge and suspension means for load or weight sustention.

Another object of the invention is to provide a resilient tire core of cellular interior as a removable filler for the commercial pneumatic tire casing having a smooth perimeter corresponding to the interior of the casing to snugly fit therein to keep the casing fully expanded.

With the foregoing, and other objects, this invention consists in such novel features of construction, combination and arrangement of parts as will be hereinafter more fully described and illustrated in the accompanying drawings of a preferred embodiment of the invention, and in the drawings like characters of reference denote corresponding parts throughout the several views, of which:

Fig. 1 is a detail plan of a portion of a core section viewed from the plane face.

Fig. 2 is a vertical section through a pneumatic tire casing with my improved core or filler taken on line 2, 2, Fig. 1.

Fig. 3 is a view similar to Fig. 2, taken on line 3, 3, Fig. 1.

Fig. 4 is a detail section of the core showing the sections united by a film of material combining the sections as an integral unit.

Fig. 5 is a detail enlarged plan view of a portion of a core section with a circular outline of cell.

The drawing particularly represents the invention as a resilient insert or removable filler for the commercial pneumatic tire casings, designed to contain an inflated inner tube.

In pneumatic tires the strength of the tire is in the carcass which is made of a cotton fabric, and the fabric must hold the internal inflated tube pressure and stand the strain.

The use of ordinary pneumatic tire casings as a protecting covering for the resilient core section merely forms one method of commercializing the core sections as it is contemplated that the core sections as a unit may constitute a resilient tire designed to be secured to a wheel rim and fully capable of withstanding the load pressure and strains and offer the same resiliency as the ordinary pneumatic tire without the danger of punctures or blow-outs.

When used as an insert or filler for pneumatic tire casings, the durability of the casing is increased, also the casing, which is ordinarily weakened through use so as to render it unfit for service with an inflated tube, may be used with the insert or filler, thus increasing the utility and life of the casing.

The casing, therefore, merely provides a protective covering for mounting the resilient tire or core sections upon a wheel rim and furnishes an auxiliary or removable tread or wearing surface for the sections.

As a filler for pneumatic tire casings, the core is composed of two annular cellular core sections 1 and 2, each in cross section, having a semi-circumferential contour with a flat face in a plane parallel with the plane of revolution, and with the flat face of one section adjacent or abutting the corresponding face of the other section.

The flat faces of the sections as a core for a resilient tire or as a filler for the commercial pneumatic tire casings extend in a line diametrical to the wheel or tire with the cavities, recesses or cells lateral or at right angles to the plane faces.

The two sections as a core unit have a cross sectional circumferential contour or perimeter corresponding to the inner cross-sectional contour of the commercial pneumatic tire casings of which the core unit is to serve as a filler therefor. It is desirable to have the dimensions of the core unit in a determined proportion to the inner dimensions of the tire casing to compactly fill all the space within the tire casing, when the core is inserted therein, and thus avoid any cavities or air pockets between the core and casing surfaces, resulting in the partial means for causing a creeping action of one member upon the other, creating undue friction, over-heating and wear detrimental to the tire. Such pockets or cells if permitted to exist enable air to be entrapped and compressed to a high pressure degree, finally causing it to forcibly escape from the pocket wearing grooves in the surface of the core and casings, impairing the life and durability of the tire. The core has an inner base portion snugly fitting between the beads or edge flanges of the outer or tire casing, lockingly seating the core within the casing, preventing any twisting or turning action of the core within the casing which would displace the cells from their normal transverse disposition about the wheel rim. It is essential that the core keep the casing expanded and full, otherwise the core would be the death of a casing designed to contain an inflated tube.

The core, preferably, for the purpose of manufacture, is made of a pair of annular sections, in which form they can be conveniently molded and the rubber stock or compound of which the sections are made can be more efficiently and uniformly cured or vulcanized. The proper and uniform curing or vulcanizing is a very important factor to the practicability of the core.

The sections, as annular core segments, are of duplicate construction, and a description of one correspondingly answers for the other. Each annular core segment may be defined as a cellular body of a contour or perimeter providing a plane side 3 and a semi-circumferential side 4. The cells extend into the body from the plane side, each having a longitudinal axis transverse to the surface of the plane side, with the base of each cell curved or rounded to correspond to the curvature or outline of the surface of the circumferential side and at a depth to provide a rim thickness of material between the base of the cell as the interior and the surface of the circumferential side as the exterior. The cells are grouped or arranged in a plurality of circumferential series or rows when viewed from the plane side of the core segment. Thus the cells in their grouped arrangement, except for the intervening walls of the material forming the cells, provide a rim wall 5 of semi-tubular cross-section interiorly braced or integrally joined by cross or truss walls, (as particularly indicated at 6, by dotted lines, Fig. 1), as a grating. The cross walls are integrally joined, characteristic of a net, lattice-work or grating, with the interstices or cells grouped to form a plurality of circumferential series or rows relatively in a superposed arrangement to provide a truss wall continuity as a plurality of spaced circumferential bands or rings 7, 7, between the rows of cells. The cells of one circumferential series or row are of different cross dimension than those of the other circumferential rows, thereby producing tapered truss walls. The grouping arrangement, dimension and outline of the cells is very important, aside from providing air chambers, increasing the resiliency and reducing the weight of segment or core as heretofore contemplated in honey-comb cushion or cellular resilient tires or fillers.

Now viewing the segmental core, Fig. 1, as in the position it will assume as a resilient tire applied to the periphery of a wheel rim or filler within the tire casing, the core may be divided into a tread or peripheral portion 8, a webbing central strut or bridge portion and inner peripheral or base portion 9. The circumference, diameter or radius of the base portion is considerably less than the diameter or radius of the tread portion. To obtain a core possessing the resiliency of a pneumatic tire, capable of sustaining the weight of the vehicle load and road shocks for a cross-sectional diameter of core, corresponding proportionately in dimension with the inner cross-sectional area of a tire casing, in its full expanded condition as if it contained a sufficiently inflated inner tube, it has been experienced that the web or bridge walls must possess a greater thickness of material toward the tire tread extremity, to sustain the load and road shocks, which results in a reduced resiliency on account of the weight of the solid material at such point. To obtain the required resiliency, the webbing is reduced in weight and thickness toward the base of the tire, which increases the resiliency without lessening its capacity for load sustention and road shocks, on account of the material reduction or variation between the base and tread portion measured between the circumferential lines.

Therefore, the outer row of cells are of proportionately different cross-sectional area than the intermediate and inner rows of cells respectively, while at the same time the web material between the cells of the outer row is proportionately heavier or of greater width than the width of material between the cells of the second and third rows, and under a preferred measurement the web width between the two cells of the outer row proportions are about that of the width of two of the web thicknesses of the second row of cells disposed in a staggered relation of the web thickness between the cells of the first row. The web thickness of the first row likewise proportions to the sum of three webs between the cells of the third or inner row. This provides for a reduction in web thickness between the outer and inner rows and a difference in spacing of their respective cells of one row from respective cells of the second or third rows as inner rows.

The webbing from the plane side of the core segment in a net or lattice-work structure provides diagonal lines or walls from the tread portion to the base portion of the tire or core, thus extending in tangent lines to a circle, having the axis of the wheel as a center. These walls are continuous with a straight line axis between the tread portion and the base portion to take care of the road shocks and lateral strains to which the tire or core may be subjected and thus insure sufficient stability to prevent the core from being crushed under such conditions.

The ring or annular band-like formations between the rows or cells provide annular suspension means for the bridge blocks 12, 13, 14, the bridge blocks being represented by the material between the cells of a row, which bear an axis diametrically with the axis of the wheel and may be considered under such construction as blocks for sustaining the weight of the load. The bridge blocks respectively of one row of cells occupy a staggered relationship to the bridge blocks respectively of a second row of perforations, and as before described, one block of the outer row may proportion approximately in thickness equal or proportionately to the combined thicknesses of two of the bridge blocks formed by the next adjacent row of cells and approximately that of three of the bridge blocks between the cells of the third row, under a pyramidal bridge block arrangement which can be definitely traced for a relative number of blocks of the several rows. The pyramidal block arrangement is primarily effective for load-sustaining and the diagonal walls effective for sustaining road shocks through continuous walls between the rim and tread portions of the core.

The edge faces of the truss and the bridging walls of the two sections are disposed so that they lie in registry, and as shown in Fig. 4, the sections in such position may be securely united or vulcanized together into an integral unit. One method of uniting the sections, that may be practised, is inserting an adhesive unvulcanized tissue or web 11 intermediate the sections, then vulcanizing the two sections together, and thereby providing a dividing wall between the aligned walls of the opposite sections, as sealed air pockets, and the air confined therein will serve as an additional means for load sustention. Vulcanizing the two sections together eliminates any friction due to any rubbing action of the walls upon each other, and also prevents the air from escaping from one pocket or cell to another and thereby wearing the abutting surfaces of the walls when the cells are compressed.

Having described my invention, I claim:

1. A tire comprising a plurality of sections separated in the plane of revolution of the tire providing plane faces, each section having recesses in said faces arranged in a plurality of circumferential rows, with the recesses of one row of a different cross sectional area at the face than those of the other rows.

2. A tire comprising a plurality of sections separated in the plane of revolution of the tire providing abutting plane faces, each section having cells in said faces arranged in a plurality of circumferential rows with the cells of one row in a staggered relation to the cells of an adjacent row, and in a superposed relation providing a circumferential band webbing between the rows, and radial bridge webbing between the rows of cells.

3. A cellular tire having its interior divided by intersecting transverse walls extending from the tread point to the rim point and at the points of intersection intermediate of said tread and rim points forming circumferential bands whereby the walls provide diagonal truss connections between the rim and tread points and radial bridge blocks between the circumferential bands and rim and tread points.

4. A tire comprising a plurality of sections separated in the plane of revolution of the tire, providing abutting plane faces, each section having cells in said faces arranged in a plurality of circumferential rows, and in a superposed relation providing a circumferential band webbing between the rows, and radial bridge webbing between the rows of cells.

5. A tire comprising a plurality of sections separated in the plane of revolution of the tire, providing abutting plane faces, each section having cells in said faces arranged in a plurality of circumferential rows, and in a superposed relation providing a circumferential band webbing between the rows, and radial bridge webbing between the rows of cells, and diagonal truss walls between the rim and base portions of the tire.

6. A cellular tire comprising a pair of half sections, secured together along a dividing line extending in the plane of revolution of the tire, each half-section when unsecured, providing a plane surface, having cells extending inward from said surface transverse thereof, and arranged in a plurality of rows, with the material between the cell rows providing truss walls and circumferential bands, with the perimeter of the section.

7. A tire comprising a pair of ring half sections secured together along a dividing line extending in the plane of revolution of the tire, each section having a cellular interior, with the cells having their longitudinal axis transverse to said dividing line, said cells arranged in circumferential rows, to provide a tubular outer wall and interior transverse and circumferential walls connecting with each other and said tubular outer wall.

8. An elastic non-inflatable tire provided with a core consisting of two annular sections, each of which comprises an outer annular wall of semi-circular cross-section, a plurality of circumferential walls integral with and within said annular wall, and transverse ribs integral with and between said walls.

9. A tire core comprising a plurality of sections having faces abutting each other in the plane of revolution, each section being provided with recesses in its face arranged in a plurality of circumferential rows, to provide an annular outer wall of semi-circular cross-section, a plurality of circumferential bands within said annular outer wall and transverse wall connecting said band and another outer wall.

10. A tire comprising a pair of half sections, having abutting plane faces in a vertical plane, each section being provided with cells extending into the section from its plane face, arranged in a plurality of circumferential superposed rows, with the cell of one row staggered from the cells of the adjacent row and at a spacing, providing a circumferential band of material between the rows.

11. A tire core comprising a pair of half sections, having abutting plane faces in a vertical plane when within a tire casing, each section being provided with cells extending transversely into the section from its plane face arranged in a plurality of circumferential superposed rows, providing an annular outer wall of semi-circular cross-section, the cells of one row arranged staggered from the walls of an adjacent row, providing diagonal truss walls within said semi-circular cross-section, and the rows at a spacing apart providing a circumferential wall of material between the rows.

12. A tire core comprising a pair of half sections, having abutting plane faces in a vertical plane when within a tire casing, each section being provided with cells extending transversely into the section from its plane face, providing an annular outer wall of semi-tubular cross-section, the cells arranged in a plurality of circumferential superposed rows, with the cells of one row of different cross-sectional area from the cells of the adjacent row, and the rows at a spacing apart providing a circumferential wall between the rows.

13. A tire core comprising a pair of annular half-sections, having abutting plane faces in a vertical plane when within a tire casing mounted in a wheel, each section provided with cells extending transversely into the section from its plane face, providing an annular outer wall of semi-tubular cross-section, the cells arranged in a plurality of circumferential superposed rows, with the rows at a spacing apart, providing a circumferential wall of material between the rows.

14. A tire core comprising a pair of annular half-sections, having abutting plane faces in a vertical plane when within a tire casing mounted on a wheel, each section provided with cells extending transversely into the section from the plane face, providing an annular outer wall of semi-tubular cross-section, the cells arranged in a plurality of circumferential superposed rows and the cells of one row arranged staggered to the cells of an adjacent row, providing diagonal truss walls within the semi-tubular outer wall, and the rows of the cells spaced apart, providing a circumferential wall of material between the rows.

15. A tire core comprising a pair of annular half-sections, having abutting plane faces in a vertical plane when within a tire casing mounted on a wheel, each section provided with cells extending transversely into the section from the plane face, providing an annular outer wall of semi-tubular cross-section, the cells arranged in a plurality of circumferential superposed rows and the cells of one row arranged staggered to the cells of an adjacent row, along diagonal tangent lines of the relative cells of all the rows on the plane face of the section, providing diagonal truss walls within the semi-tubular outer wall, and the rows of the cells spaced apart, providing a circumferential wall of material between the rows.

16. The plurality of circumferential rows of cells in definitely disposed relationship, such that at any place the intersecting diagonal lines can be drawn at the same angle transversely to the rows, without intercepting any of the cells of said successive rows, providing solid intersecting supporting struts of rubber corresponding to said lines of definition.

17. An elastic non-inflatable tire, provided with a core consisting of two annular sections having flat meeting faces radially of the tire, each section having cells extended therein transversely from its flat faces, providing a honeycombed interior forming said sections, each to consist of an outer annular wall of semi-circular cross-section, transverse intersecting semi-circular ribs, joined at their curved edges to said outer wall and intermediate of their lengths to each other, and forming transverse truss connections of said outer wall, and circumferential walls, said ribs being provided with thickened combined tie and brace connections with each other and with the thickened combined tie and brace connections with said outer wall.

18. An elastic non-inflatable tire, provided with a core consisting of two annular sections, each of which consists of an outer annular wall of semi-circular cross-section and transverse intersecting semi-circular ribs joined at their curved edges to said outer wall and intermediately of their lengths to each other and forming transverse truss connections of said outer wall, said ribs being provided with thickened combined tie and brace connections with each other and with thickened combined tie and brace connections with said outer wall, each section having recesses between the ribs thereof and the recesses of one section being staggered with relation to the recesses of the other section, and spaced apart to provide a circumferential wall between the recesses.

19. An elastic non-inflatable tire, provided with a core consisting of two annular sections, each of which consists of an outer annular wall of semi-circular cross-section and transverse intersecting semi-circular ribs joined at their curved edges to said outer wall, joined at both ends thereof to each other and to said outer wall and intermediately of their lengths joined to each other and the intermediate circumferential walls, and forming transverse truss connections of said outer wall, said ribs being provided with thickened combined tie and brace connections with each other and with thickened combined tie and brace connections with said outer wall.

20. An elastic non-inflatable tire, provided with a core consisting of two annular sections, each of which consists of an outer annular wall of semi-circular cross-section and transverse intersecting semi-circular ribs joined at their curved edges to said outer wall and intermediately of their lengths joined to each other and forming transverse truss connections of said outer wall and intermediate circumferential walls.

21. An elastic non-inflatable tire, provided with a core consisting of two annular sections, each of which consists of an outer annular wall of semi-circular cross-section and transverse intersecting semi-circular ribs joined at their curved edges to said outer wall and intermediately of their lengths joined to each other and forming transverse truss connections of said outer wall, each section having recesses between the ribs thereof and the recesses of one section being staggered with relation to the recesses of the other section and spaced apart to provide a circumferential wall between the recesses.

22. An elastic non-inflatable tire, provided with a core consisting of two annular sections each of which consists of an outer annular dished wall, intermediate circumferential walls, and transverse truss connections of said wall disposed in pairs intersecting each other radially of the tire, the sections having flat meeting faces.

23. An elastic non-inflatable tire, provided with a core consisting of two annular sections, each of which is composed of an outer annular dished wall, intermediate circumferential walls, and transverse truss connections of said wall disposed radially of the tire in pairs intersecting each other, the sections having flat meeting faces and being provided with recesses between the truss connections, the recesses of one section being staggered with relation to the recesses of the other section.

24. An elastic non-inflatable tire for motor vehicles, including two sections each annular and provided with a convex outer face and a plane inner face, the plane faces of the two sections being in contact with each other, each section having a series of recesses of circular cross-section, and radial braces formed of the rubber material of the section and separating the members of the series of recesses, said braces being of double tapered or I-form.

25. An elastic non-inflatable tire for motor vehicles, including two sections each annular and provided with a convex outer face and a plane inner face, the plane faces of the two sections being in contact with each other, each section having inner and outer series of recesses of circular cross section opening into the plane face thereof and extending toward the convex face, the series of recesses of each section being staggered, radial braces formed of the rubber material of the section and separating the members of each series of recesses, and braces also formed of the material of the section and angularly disposed with relation to both series of radial braces and connecting the same strutwise, said braces being all of double tapered or I-form.

26. An elastic non-inflatable tire for motor vehicles, including two sections each annular and provided with a convex outer face and a plane inner face, the plane faces of the two sections being in contact with each other, each section having a series of recesses of oval cross section, and radial braces formed of the rubber material of the section and separating the members of the series of recesses, said braces being of double tapered or I-form.

27. An elastic non-inflatable tire, provided with a core consisting of two annular sections, each of which consists of an outer annular wall of semi-circular cross-section and transverse intersecting semi-circular ribs joined at their curved edges to said outer wall and intermediately of their lengths to each other and forming transverse truss connections of said outer wall, said ribs being provided with thickened combined tie and brace connections with each other and with thickened combined tie and brace connections with said outer wall.

28. An elastic non-inflatable tire, provided with a core consisting of two annular sections, each of which consists of an outer annular wall of semi-circular cross-section and transverse intersecting semi-circular ribs joined at their curved edges to said outer wall, joined at both ends thereof to each other and to said outer wall and intermediately of their lengths joined to each other, and forming transverse truss connections of said outer wall, said ribs being provided with thickened combined tie and brace connections with each other and with thickened combined tie and brace connections with said outer wall.

29. An elastic non-inflatable tire, provided with a core consisting of two annular sections, each of which consists of an outer annular wall of semi-circular cross-section and transverse intersecting semi-circular ribs joined at their curved edges to said outer wall and intermediately of their lengths joined to each other and forming transverse truss connections of said outer wall.

30. An elastic non-inflatable tire, provided with a core consisting of two annular sections each of which consists of an outer annular dished wall and transverse truss connections of said wall disposed in pairs intersecting each other radially of the tire, the sections having flat meeting faces.

In witness whereof, I hereunto subscribe my name, as attested by the two subscribing witnesses.

CHRIS H. LAMBERT.

Witnesses:
L. A. BECK,
M. S. BARRON.